US009841778B2

(12) United States Patent
Varma

(10) Patent No.: US 9,841,778 B2
(45) Date of Patent: *Dec. 12, 2017

(54) USE OF DISTRIBUTED GENERATOR (DG) INVERTERS AS STATCOMS FOR DECREASING LINE LOSSES

(71) Applicant: Rajiv Kumar Varma, London (CA)

(72) Inventor: Rajiv Kumar Varma, London (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/229,980

(22) Filed: Aug. 5, 2016

(65) Prior Publication Data

US 2017/0031379 A1    Feb. 2, 2017

Related U.S. Application Data

(63) Continuation of application No. 13/836,276, filed on Mar. 15, 2013, now Pat. No. 9,436,200.

(60) Provisional application No. 61/681,335, filed on Aug. 9, 2012.

(51) Int. Cl.
| | | |
|---|---|---|
| G05B 19/042 | (2006.01) |
| G05F 1/66 | (2006.01) |
| H01J 3/38 | (2006.01) |
| H02J 3/38 | (2006.01) |

(52) U.S. Cl.
CPC .......... *G05F 1/66* (2013.01); *G05B 19/0426* (2013.01); *H02J 3/383* (2013.01); *H02J 3/386* (2013.01); *G05B 2219/40458* (2013.01); *G05B 2219/50083* (2013.01)

(58) Field of Classification Search
CPC ...... G05B 19/0426; G05B 2219/40458; G05B 2219/50083; G05F 1/66; H02J 3/383; H02J 3/386

USPC .......................................................... 700/298
See application file for complete search history.

(56) References Cited

U.S. PATENT DOCUMENTS

| | | | |
|---|---|---|---|
| 7,660,649 B1 | 2/2010 | Hope |
| 2005/0055432 A1 | 3/2005 | Rodgers |

FOREIGN PATENT DOCUMENTS

| | | | |
|---|---|---|---|
| WO | 2010093345 A1 | 8/2010 |
| WO | 2011032265 A1 | 3/2011 |

OTHER PUBLICATIONS

International Search Report and Written Opinion for PCT/CA2013/050213 dated May 23, 2013.

(Continued)

*Primary Examiner* — Kenneth M Lo
*Assistant Examiner* — Yuhui R Pan
(74) *Attorney, Agent, or Firm* — Brion Raffoul

(57) ABSTRACT

The invention provides systems, methods, and devices relating to the provision of system-wide coordinated control voltage regulation support in power transmission and distribution networks using multiple inverter based power generation facilities, which are coupled to the power transmission and distribution networks for minimizing transmission and distribution line losses. The invention uses a novel control method of inverter based Distributed Generators as Static Synchronous Compensator (STATCOM) in a way that provides a dynamic voltage regulation/control with the inverter capacity remaining after real power generation, thereby decreasing system line losses.

10 Claims, 6 Drawing Sheets

(56) References Cited

OTHER PUBLICATIONS

Nara et al. "Network Reconfiguration for Loss Minimization and Load Balancing", IEEE Power Engineering Society General Meeting, vol. 4, pp. 2413-2418, Jul. 17, 2003.
Saad et al. "Application of STATCOMs to Wind Farms" IEE Proc. Gener. Transm. Distrib., vol. 145, No. 5, Sep. 1998.

USE OF DISTRIBUTED GENERATOR (DG) INVERTERS AS STATCOMS FOR DECREASING LINE LOSSES

RELATED APPLICATIONS

This application is a Continuation application of U.S. patent application Ser. No. 13/836,276 filed on Mar. 15, 2013, which claims the benefit of U.S. Provisional Patent Application No. 61/681,335 filed on Aug. 9, 2012.

FIELD OF THE INVENTION

The present invention relates to inverter based distributed power generation facilities. More specifically, the present invention relates to a system wide coordinated control of multiple inverter based Distributed Generators (DGs) which operate as Static Synchronous Compensators (STATCOMs) in utility networks for minimizing transmission/distribution line losses, utilizing their inverter capacity remaining after real power generation.

BACKGROUND

Utility companies everywhere are faced with excessive electric power transmission and distribution losses. These losses occur due to the conversion of electricity to heat and electromagnetic energy. Ever since building the first electric power transmission line, this has simply been an accepted cost of doing business in the utility industry. According to the U.S. Energy Information Administration (EIA) data, national annual electricity transmission and distribution losses average about 7% of the electricity that is transmitted in the United States. If we compare this value to those submitted by other countries to the World Development Indicators (WDI) database, it is clear that 7% is a relatively modest number. A majority of countries face line loss problems of 20% or more, while others in less developed areas exceed line losses of up to 30%, and by doing so they are not only losing revenue (millions of dollars), but also causing higher emissions for the same amount of delivered electricity.

To manage the losses associated with the electric power transmission and distribution, voltage levels along the distribution line must be controlled. Traditional methods of reducing line losses involve the use of transformer taps or the installation of voltage regulators and bus capacitors at several locations for voltage control. However, these methods are coarse and do not provide a suitably rapid and precise control of voltage for reducing line losses in an optimal manner.

In light of the above, there is a need for systems, methods, and devices which provide dynamic voltage control to thereby minimize line losses.

SUMMARY

The present invention provides systems, methods, and devices relating to the provision of system wide coordinated voltage regulation support in power transmission and distribution networks using multiple inverter based power generation facilities that are coupled to the power transmission and distribution networks. An inverter based power generation facility, such as a photovoltaic (PV) based solar farm or a converter based wind farm, can provide dynamic voltage regulation/control with their inverter capacity remaining after real power generation, in order to decrease system line losses. For PV solar farms, this can be done at any time at night and during non-peak daytime operations. For other inverter based DGs, this can be done at any time during the entire 24-hour period, as long as they are not producing their rated real power output.

In one embodiment, the present invention provides a method for reducing line losses in a power transmission and distribution network, the method comprising:
  determining operating parameters and constraints of said power distribution and transmission network;
  determining a desired voltage profile for said network based on said operating parameters and constraints, and said desired voltage profile being the voltage levels at different points in the network which minimize line losses on said network;
  communicating said desired voltage profile to at least one inverter based power generation facility operatively coupled to said network;
wherein said at least one power generation facility operates as a static synchronous compensator (STATCOM) to regulate (control) the voltage at a point of common coupling for each power generation facility towards said desired voltage profile through exchange (injection or absorption) of controlled reactive power with said power transmission and distribution network, said controlled reactive power being based on inverter capacity for said at least one power generation facility available after real power generation.

In another aspect, the present invention provides computer-readable media having encoded thereon computer readable and computer executable instructions which, when executed, implements a method for reducing line losses in a power transmission and distribution network, the method comprising:
  determining operating parameters and constraints of said power distribution and transmission network;
  determining a desired voltage profile for said network based on said operating parameters and constraints, and said desired voltage profile being the voltage levels at different points in the network which minimize line losses on said network;
  communicating said desired voltage profile to at least one inverter based power generation facility operatively coupled to said network;
wherein said at least one power generation facility operates as a static synchronous compensator (STATCOM) to regulate (control) the voltage at a point of common coupling for each power generation facility towards said desired voltage profile through exchange (injection or absorption) of controlled reactive power with said power transmission and distribution network, said controlled reactive power being based on inverter capacity for said at least one power generation facility available after real power generation.

In a further aspect, the present invention provides a method for reducing line losses in a power transmission and distribution network, the method comprising:
  a) at a specific inverter-based power generation facility, receiving an indication that voltage control support is required for line loss minimization for said power transmission and distribution network;
  b) receiving operating parameters and constraints of said power distribution and transmission network;
  c) determining a desired voltage for a specific location on said network, said desired voltage being determined based on said operating parameters and constraints, and said desired voltage being a voltage which minimizes line losses on said network;

d) regulating (controlling) the voltage at a point of common coupling for said power generation facility towards said desired voltage profile through exchange (injection or absorption) of controlled reactive power with said power transmission and distribution network, said controlled reactive power being based on inverter capacity for said at least one power generation facility available after real power generation.

wherein said at least one power generation facility operates as a static synchronous compensator (STATCOM) to provide voltage control to said network.

Yet another aspect of the present invention provides computer readable media having encoded thereon computer readable and computer executable instructions which, when executed, implements a method for reducing line losses in a power transmission and distribution network, the method comprising:

a) at a specific inverter-based power generation facility, receiving an indication that voltage control support is required for line loss minimization for said power transmission and distribution network;

b) receiving operating parameters and constraints of said power distribution and transmission network;

c) determining a desired voltage for a specific location on said network, said desired voltage being determined based on said operating parameters and constraints, and said desired voltage being a voltage which minimizes line losses on said network;

d) regulating (controlling) the voltage at a point of common coupling for said power generation facility towards said desired voltage profile through exchange (injection or absorption) of controlled reactive power with said power transmission and distribution network, said reactive power being based on inverter capacity for said at least one power generation facility available after real power generation.

wherein said at least one power generation facility operates as a static synchronous compensator (STATCOM) to provide voltage control to said network.

Another aspect of the present invention provides a method of generating income for an inverter-based power generation facility, the method comprising:

a) receiving an indication that voltage control support is required for said power transmission and distribution network for line loss minimization;

b) receiving parameters and operating constraints for said power distribution and transmission network;

c) regulating (controlling) the voltage at a point of common coupling for said power generation facility towards said desired voltage profile through exchange (injection or absorption) of controlled reactive power with said power transmission and distribution network, said reactive power being based on inverter capacity for said at least one power generation facility available after real power generation;

d) charging a power utility entity for providing said voltage control support to said power transmission and distribution network for reducing its line losses;

wherein said power generation facility operates as a static synchronous compensator (STATCOM) to provide voltage control to said network.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

Figure 1:
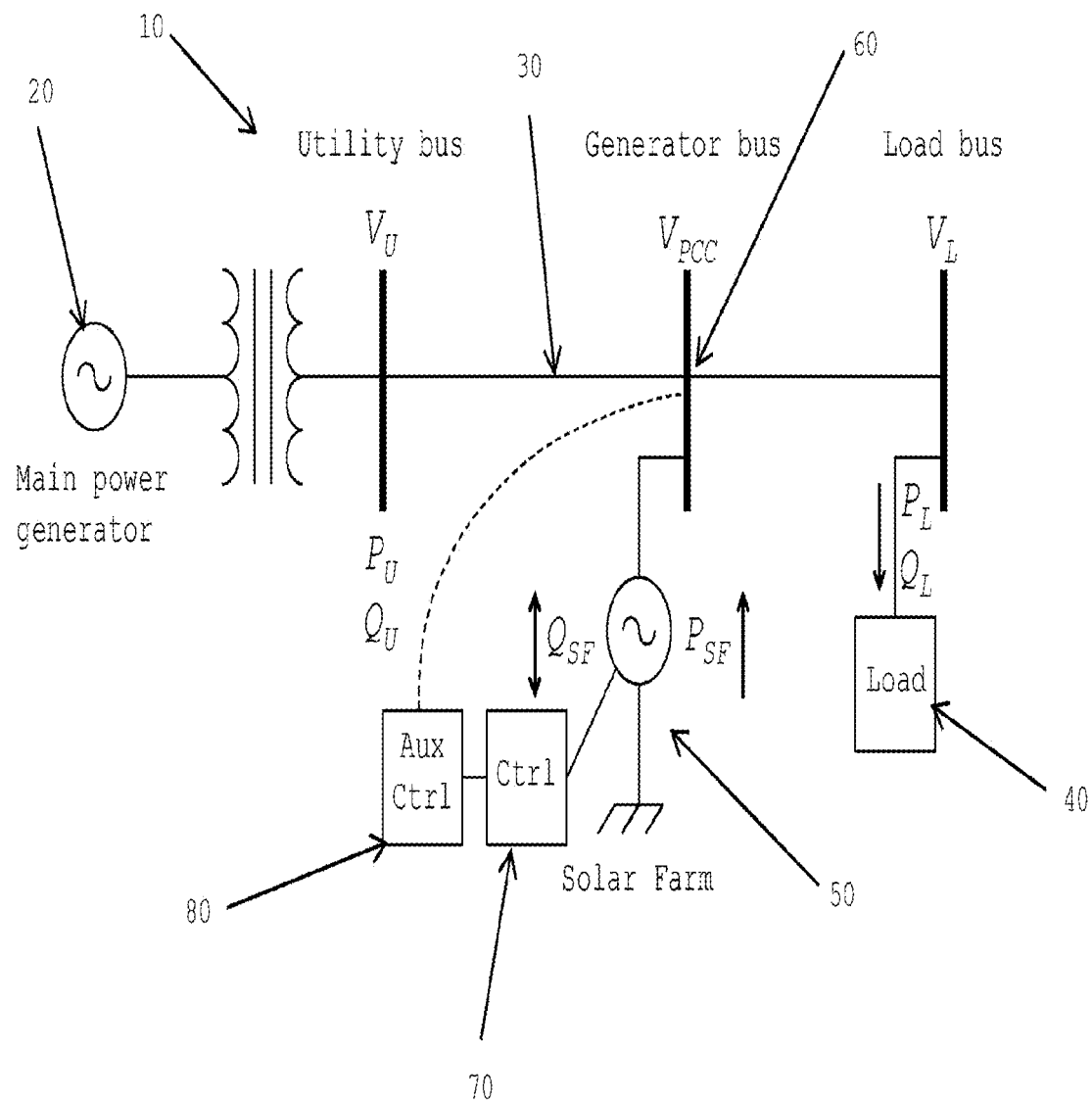
FIG. 1 shows a system block diagram of an embodiment of the present invention.

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicate that two or more elements are in either direct or indirect (with other intervening elements between them) physical or electrical contact with each other, or that the two or more elements co-operate or interact with each other (e.g. as in a cause and effect relationship).

Flexible Alternating Current Transmission System (FACTS) devices offer a viable solution to rapid and precise control of voltage on power transmission networks. They are employed in power systems worldwide. FACTS are defined here as alternating current transmission systems incorporating power-electronic based controllers and other static controllers to enhance controllability and increase power transfer capability. FACTS devices are typically utilized to accomplish the following objectives:

Voltage control;
Increase/control of power transmission capacity in a line, and for preventing loop flows;
Improvement of system transient stability limit;
Enhancement of system damping;
Mitigation of sub-synchronous resonance;
Alleviation of voltage instability;
Limiting short circuit currents;
Improvement of high-voltage direct current (HVDC) converter terminal performance;
Grid Integration of Wind Power Generation Systems.

Some of the devices/controllers in the family of the FACTS devices that have been used for achieving any or all of the above objectives are Static Var Compensators (SVC, non-inverter based) and Static Synchronous Compensators (STATCOM, inverter based), etc.

Power utility companies can use inverter based STATCOMs to provide controlled reactive power or voltage support to their power transmission networks. STATCOMs can act as a source or a sink of reactive power for the power transmission and distribution network and can assist in voltage regulation for the power transmission and distribution network. More technically, a static synchronous compensator (STATCOM) is a shunt connected reactive power compensation device capable of generating and/or absorbing reactive power and whose output can be varied to control specific parameters of an electrical power system, one such parameter being bus voltage. In general terms, a STATCOM is a solid-state switching converter that is capable of independently exchanging (generating or absorbing) controllable real and reactive power at its output terminals when it is fed from an energy source or an energy storage device at its input terminals.

More specifically, the STATCOM is a voltage sourced converter that produces from a given input of direct current (DC) voltage a set of three-phase AC output voltages. Each output voltage is in phase with and is coupled to the corresponding AC system voltage through a relatively small reactance (which can be provided either by an interface reactor or leakage inductance of a coupling transformer). The DC voltage is provided by an energy storage capacitor.

It is also known that a STATCOM provides desired reactive power generation, as well as reactive power absorption, by means of electronic processing of voltage and current waveforms in a voltage sourced converter (VSC). The STATCOM also provides voltage support by generating or absorbing reactive power at the point of common coupling (PCC) without the need for large external reactors or capacitor banks. Therefore, the STATCOM occupies a much smaller physical footprint.

In a very simplified manner, a STATCOM can be viewed as a continuously variable capacitor and continuously variable inductor.

While installed STATCOMs can alleviate voltage regulation issues to a certain degree in existing power transmission and distribution networks, the currently installed base of STATCOMs can be quite expensive and, as such, power utility companies are hesitant to install further STATCOMs for voltage control support unless it is shown to be cost-effective.

The disclosed embodiments herein are merely exemplary, and it should be understood that the invention may be embodied in many various and alternative forms. For purposes of teaching and not limitation, the illustrated embodiments are directed to a method of voltage regulation/control in a DG system using a solar farm inverter or any other inverter-based power generation facility as a STATCOM.

The utilization of solar farm inverters and wind farm inverters as STATCOMs is applicable regardless of the following:
Type and configuration of inverter, e.g., 6 pulse, multi-pulse, multilevel, etc;
Type of semiconductor switches used in inverters, e.g., gate turn-off thyristor (GTO), insulated gate bipolar transistor (IGBT), etc.;
Type of firing methodology used, e.g., pulse width modulation (PWM), sinusoidal pulse width modulation (SPWM), hysteresis control, phase locked loop (PLL) based, etc.;
Methodology of controller design, e.g., pole placement, lead lag control, genetic algorithm based control, etc.;
Choice of auxiliary control signals, e.g., local signals such as line current magnitude, active power flow, local bus frequency, remote signals such as phasor measurement unit (PMU) acquired signals, etc.

The present document refers to a photovoltaic (PV) solar farm. However, the skilled artisan will understand that the present invention is not limited to this type of solar-based power generation system, but can be used with any distributed power generation source where a voltage sourced inverter is being utilized.

The present invention relates to a coordinated control of at least one inverter based Distributed Generator (DG) to perform as a Static Synchronous Compensator (STATCOM), for minimizing transmission/distribution line losses. Through the coordinated control, the inverter based DGs across the network (locations in the power system, where inverter based DGs are connected) provide dynamic voltage regulation/control with their inverter capacity remaining after real power generation as directed by the system operator, in order to decrease system line losses. The optimal amount of voltage regulation/control support is determined according to the power conditions of the transmission and distribution network.

This application of inverter based DGs opens up a new opportunity to earn revenues in excess of what the DGs currently earn from the sale of real power with the same amount of inverter capacity. The DGs would also be eligible to receive a share of the profit/benefit incurred by the system operator or any other beneficiary as a result of minimizing transmission/distribution line loss through voltage control provided by the inverter based DGs. This invention applies to both night-time and daytime operations of PV solar systems, and during the entire 24-hour period for other inverter based DGs, as long as there is inverter capacity left after real power generation.

The following description will first discuss a system-wide application of one aspect of the invention. Afterwards, a single DG implementation of another aspect of the invention will be discussed. For the system-wide application, a central energy control centre determines the operating parameters of the power distribution network and, based on these parameters and system operating constraints, the desired voltage level settings on the network are determined. The desired voltage level settings are then communicated to multiple DGs. These DGs then adjust their parameters to provide voltage support such that the voltage at the point of common coupling (PCC) for each of the DGs is close to if not at the desired voltage setting. For the single DG implementation, the DG requests the operating parameters and constraints of the power distribution network and, based on these parameters and constraints, the DG calculates the desired voltage at the PCC. The DG then regulates its voltage to ensure that the desired voltage is achieved or at least approximated at the PCC.

FIG. 1 illustrates a single-line representative diagram of the exemplary system 10. In a typical distribution network a main power generation facility 20 connects to the utility bus. The utility bus with a voltage value of $V_U$ couples to a power transmission and distribution network 30. At the other end of the power transmission and distribution network 30 is a load 40, coupled to the load bus with a voltage value of $V_L$. For simplicity, the loads on the system are combined together, which may be a separate power system, or an industrial complex with a variety of devices which may include induction motors.

Transmission/distribution line losses are dependent on voltages at different locations along the lines. In a poor voltage regulated network, the line losses assume large values, and valuable real power is lost as heat in the lines. For example, if the voltage difference between $V_U$ and $V_L$ is large, the line loss will be large as well. The line loss can be minimized by properly regulating the voltages along the power transmission and distribution network. In FIG. 1, an inverter based power generation facility 50 couples to the power transmission network at the point of common coupling (PCC) 60. The power generation facility 50 is equipped with power generation modules, a conventional inverter controller 70, and an auxiliary controller 80. For better understanding, the flow of powers (active and reactive) at different locations is also highlighted in the diagram.

Figure 2:
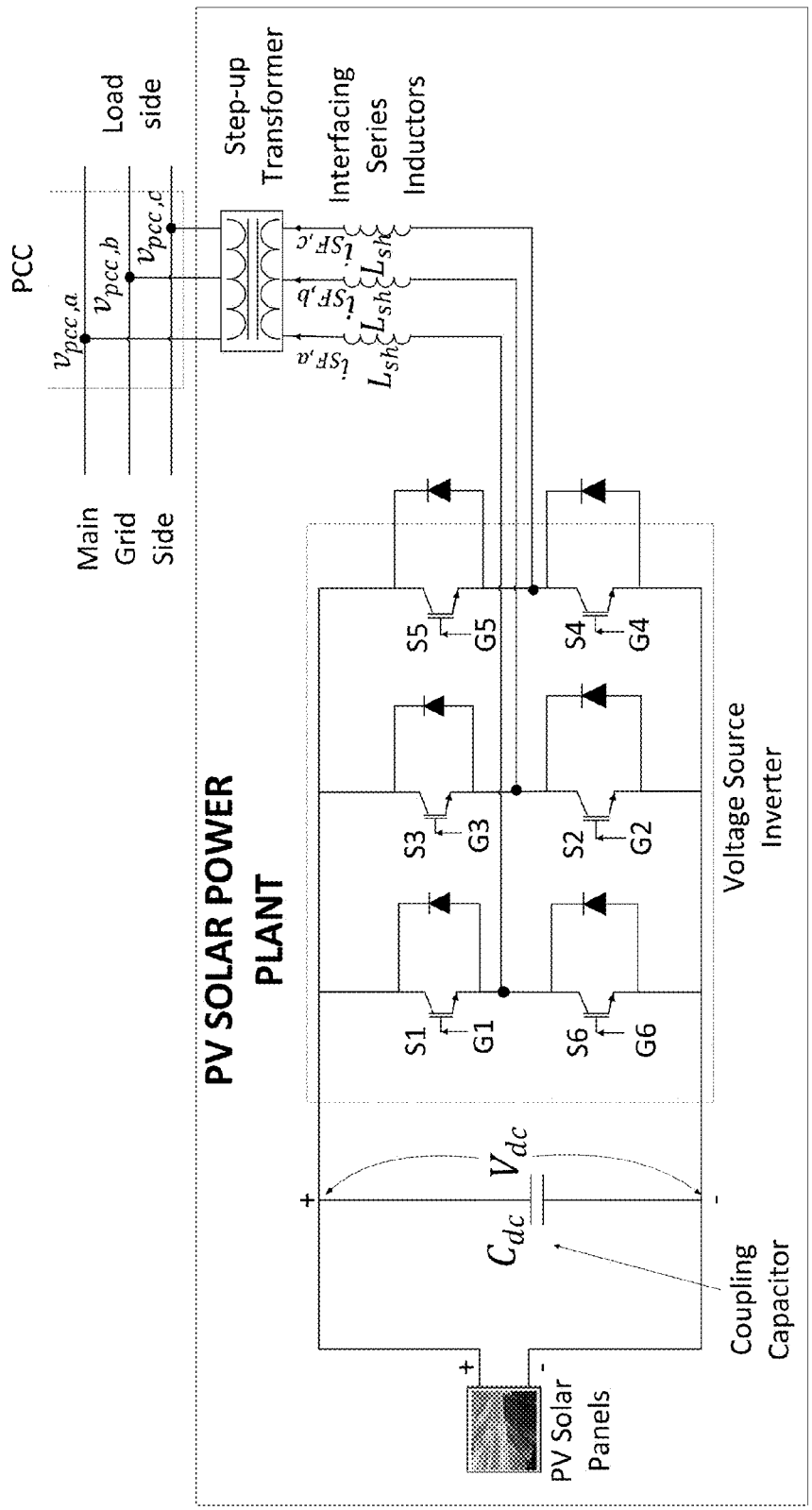
FIG. 2 shows a detailed PV solar farm schematic illustrating the features in conventional solar farm circuitry.

FIG. 2 is a detailed PV solar farm schematic, modeled as a voltage sourced inverter with a DC bus capacitor. The voltage sourced inverter is realized by utilizing six semiconductor switches (here, IGBTs). It may be understood that there are several types/configurations of voltage sourced converters/inverters. However, the invention applies to any type/configuration of the inverter. The inverter is connected to the network through interfacing series inductors and/or a step-up transformer. The point at which the PV solar farm is connected to the power transmission network is termed as the point of common coupling (PCC). The currents injected/delivered by the PV solar farm are denoted as $i_{SF,a}$, $i_{SF,b}$ and $i_{SF,c}$.

In a further aspect, this document discloses a method for reducing line losses in a power transmission and distribution network, the method comprising:

a) at a specific inverter based power generation facility, receiving an indication that voltage control support is required for line loss minimization;

b) receiving operating parameters and constraints of said power transmission and distribution network from an energy control center of said power transmission and distribution network;

c) determining a specific voltage for a specific location on said power transmission and distribution network, said specific location corresponding to said specific inverter based power generation facility, said specific voltage being determined based on an optimal load flow determination performed at said specific inverter based power generation facility and said optimal load flow determination being based on said operating parameters and constraints received in step b), said specific voltage being a voltage that minimizes line losses on said power transmission and distribution network;

d) regulating a voltage at a point of common coupling for said specific inverter based power generation facility, said voltage being regulated towards said specific voltage through injecting or absorbing controlled reactive power with said power transmission and distribution network, said controlled reactive power being based on an inverter capacity for said specific inverter based power generation facility available after real power generation, wherein a normal real power production function of said specific inverter based power generation facility continues while injecting or absorbing controlled reactive power with said power transmission and distribution network;

e) repeating steps b), c) and d) at a set time interval determined by said energy control center of said power transmission and distribution network;

wherein an inverter of said specific inverter based power generation facility operates as a static synchronous compensator (STATCOM) to inject or absorb controlled reactive power with said power transmission and distribution network in step d);

wherein said specific inverter based power generation facility and the said energy control center coordinate said voltage regulation on said power transmission and distribution network.

In a further aspect, this document discloses a non-transitory computer readable media having encoded thereon computer readable and computer executable instructions which, when executed, implements a method for reducing line losses in a power transmission and distribution network, the method comprising:

a) at a specific inverter based power generation facility, receiving an indication that voltage control support is required for line loss minimization;

b) receiving operating parameters and constraints of said power transmission and distribution network from an energy control center of said power transmission and distribution network;

c) determining a specific voltage for a specific location on said power transmission and distribution network, said specific location corresponding to said specific inverter based power generation facility, said specific voltage being determined based on an optimal load flow determination performed at said specific inverter based power generation facility and said optimal load flow determination being based on said operating parameters and constraints received in step b), said specific voltage being a voltage that minimizes line losses on said power transmission and distribution network;

d) regulating a voltage at a point of common coupling for said specific inverter based power generation facility, said voltage being regulated towards said specific voltage through injecting or absorbing controlled reactive power with said power transmission and distribution network, said controlled reactive power being based on an inverter capacity for said specific inverter based power generation facility available after real power generation, wherein a normal real power production function of said specific inverter based power generation facility continues while injecting or absorbing controlled reactive power with said power transmission and distribution network;

e) repeating steps b), c) and d) at a set time interval determined by said energy control center of said power transmission and distribution network;

wherein an inverter of said specific inverter based power generation facility operates as a static synchronous compensator (STATCOM) to inject or absorb controlled reactive power with said power transmission and distribution network in step d);

wherein said specific inverter based power generation facility and the said energy control center coordinate said voltage regulation on said power transmission and distribution network.

In a further aspect, this document discloses a method of generating income for at least one inverter based power generation facility operatively coupled to a power transmission network, the method comprising:

a) determining specific voltage setpoints for said at least one inverter based power generation facility based on an optimal load flow determination performed at an energy control center, said specific voltage setpoints being voltages that minimize line losses on said power transmission and distribution network;

b) communicating said specific voltage setpoints from said energy control center to said at least one inverter based power generation facility;

c) repeating steps a) and b) at set time intervals determined by said energy control center;

d) operating said at least one inverter based power generation facility as a static synchronous compensator (STATCOM) and using said at least one inverter based power generation facility to inject or absorb controlled reactive power with said power transmission and distribution network to thereby regulate a voltage at a point of common coupling, said voltage being regulated towards a specific voltage setpoint for said at least one inverter based power generation facility, said point of common coupling being a coupling point between said at least one inverter based power generation facility and said power transmission and distribution network;

e) charging a power utility entity for providing voltage control support for line loss minimization to said power transmission and distribution network;

wherein said controlled reactive power injected to or absorbed from said power transmission and distribution network is based on an inverter capacity for said at least one inverter based power generation facility available after real power generation.

Figure 3:
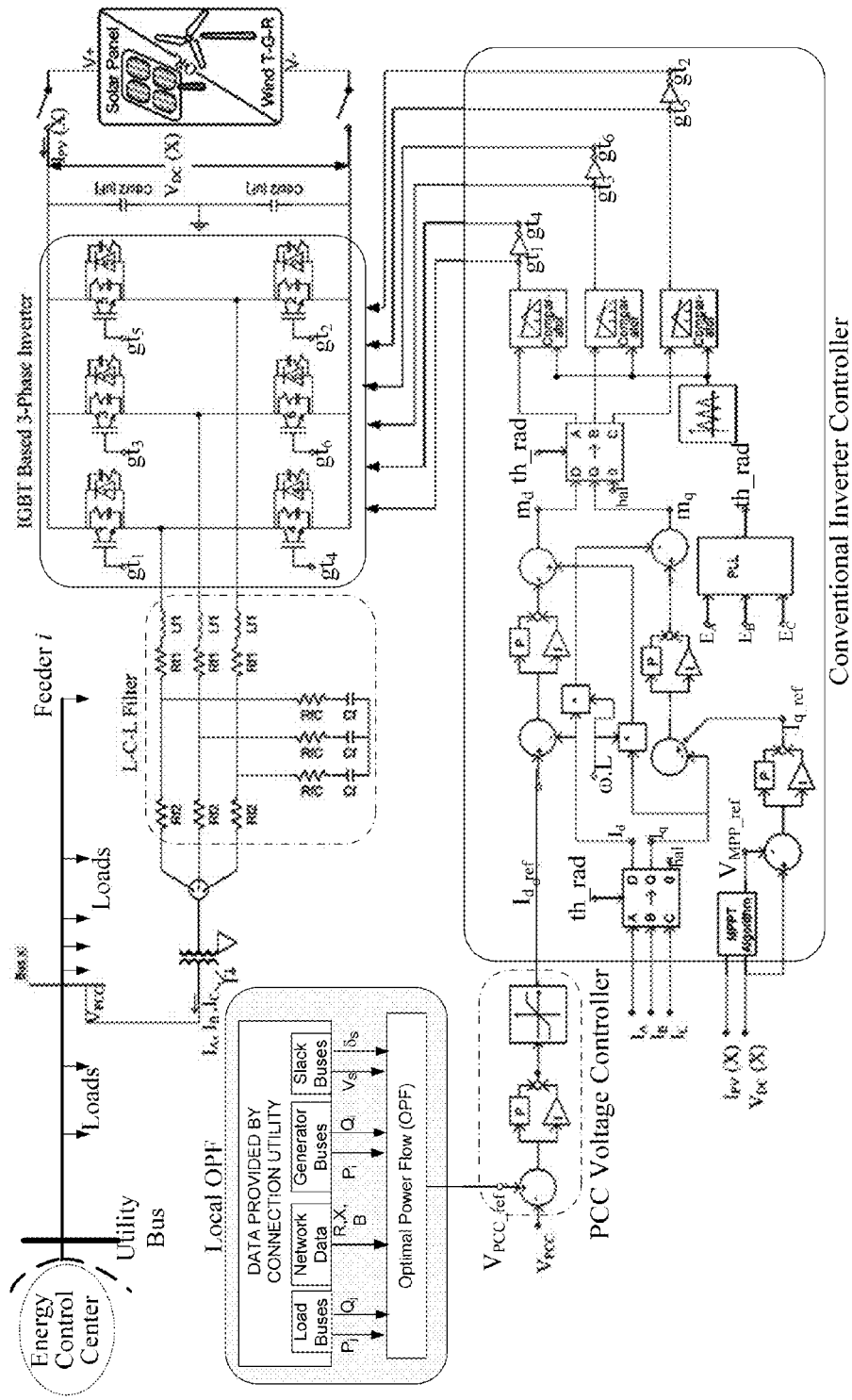
FIG. 3 shows a circuit diagram illustrating the circuitry at a PV solar farm including an auxiliary voltage controller.

Referring to FIG. 3, a block diagram of a PV solar farm circuitry according to one aspect of the invention is illustrated. The conventional inverter controller 90 controls the reactive power output of the inverter 100 such that it can perform close to unity power factor operation along with the DC link voltage control. Two current control loops are used to generate all the switching signals for the IGBT matrix. The upper current control loop regulates the reactive power, whereas the lower current control loop regulates the DC link voltage. To control the generator bus voltage an auxiliary PCC voltage controller block 110 is added to the upper current control loop part of the conventional inverter controller 90. The PCC voltage controller 110 is used for comparing the measured voltage signal at PCC, $V_{PCC}$, with the obtained reference voltage value of PCC, $V_{PCC\_ref}$. The output of the PCC voltage controller block sets the reference value of $I_d$, which ultimately controls the reactive power flow from the inverter. The input to the PCC voltage controller is received from the Optimal Power Flow (OPF) block 120 which may be local to the DG or which may be located at an energy control centre.

Electric power utilities routinely run a load flow program to determine the amount of real power generation from different power sources (hydro, nuclear, thermal, renewable based, gas fired, etc.) to be able to meet the load demand as well as supply the transmission system losses, without violating system constraints. The generating sources are termed as PV buses (nodes). P represents real power and V represents the bus voltage magnitude. The load terminals are termed as PQ buses, P represents real power demand of the load while Q represents the reactive power demand of the load. The reference of the entire power system is provided by the slack bus termed $V_{sref}, \theta_{s,ref}$ bus. $V_{sref}$ is the reference voltage of the slack bus while $\theta_{s,ref}$ represents the reference bus voltage angle. The optimal load flow program determines the optimal combination of power generation from different generating sources to supply the system load demand, such that the line losses are minimized without violating system constraints. Some of these system constraints include maximum voltage variations at any bus, maximum line flows, maximum power flow in a transformer, minimum power generation cost, etc. The end result of the optimal load flow study is that the real power generation $P_i$ and terminal voltage magnitude $V_j$ at each power generating bus are such that losses are minimum. "i" represents PV generating buses while the index "j" reflects the PQ load buses. Utilities operate the conventional generating sources at these optimal values to meet the load demand as well as to minimize the line losses or to minimize the total system generating/operating cost. This technique has not been adopted by PV solar farms and wind farms so far for minimizing line losses. This can only be done if the PV solar farm or wind farm is operated as a STATCOM, i.e. a voltage regulator.

Figure 4:
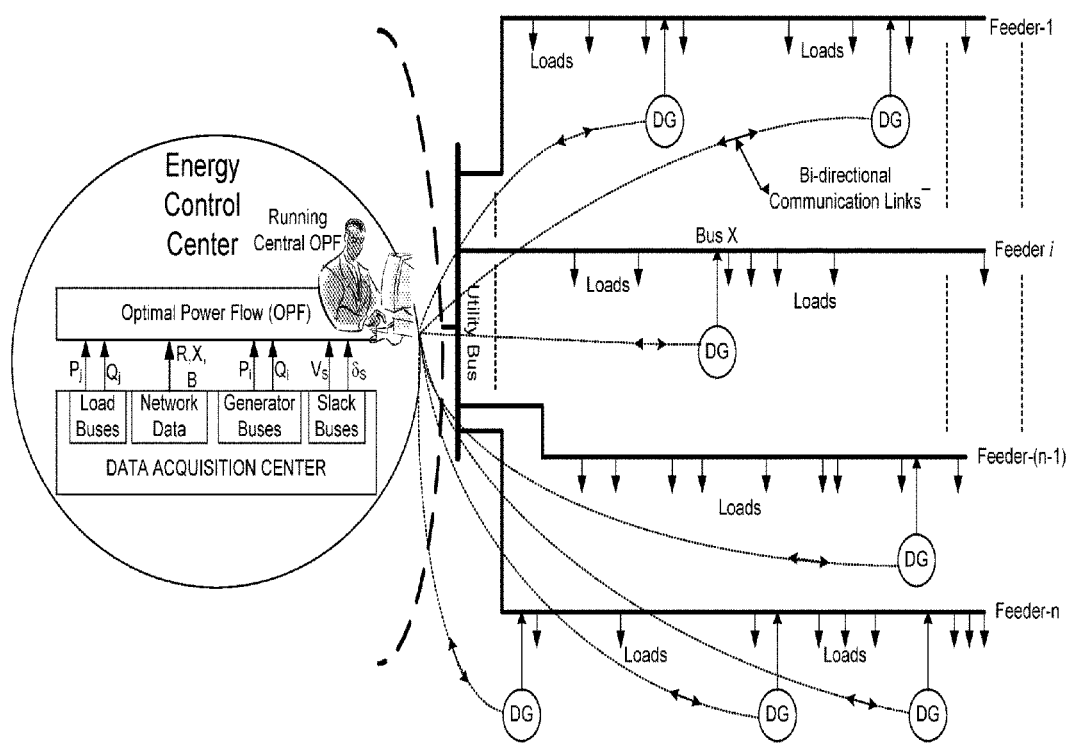
FIG. 4 illustrates a system-wide control schematic for coordinated control according to one implementation of the invention.

To minimize line loss, and thereby provide voltage control support to the power transmission and distribution network, the network administrator at an energy control center performs an optimal power flow (OPF) study at regular intervals on the transmission/distribution system to determine the optimal voltage levels at different points in the network, such that if the system were to be operated at those voltage levels the line losses would be minimum (See FIG. 4). To determine the optimal voltage levels through OPF, several parameters are needed, such as: (i) network impedances, (ii) slack bus voltage and angle, (iii) real and reactive power of all loads in the system, (iv) real power and voltage of all the generators, (v) Operating constraints, etc.

This data can be obtained from the data acquisition center at the energy control center. After determining the optimal solution of voltage set points through a central OPF solution to minimize the network line losses subject to system operating constraints, these set points or desired voltages are communicated through bidirectional communication channels to the relevant inverter based DGs. FIG. 4 is a schematic diagram illustrating the distributed DGs and their communications relationship with the energy control center.

Once the power generation facility (the DG) receives the optimal voltage level ($V_{PCC\_ref}$), the voltage at PCC ($V_{PCC}$) will be adjusted to try and achieve the optimal value through the available reactive power capability of the PV solar farm inverter. This may be done by utilizing the inverter capacity remaining after real power generation and, as noted above, this is done in order to decrease system line loss. All inverter based DGs coupled to the power transmission and distribution network will preferably be coordinated together in a centralized manner by the utility. This can be done at any time during the night-time operation of PV solar systems and preferably during the non-peak power generation hours of operation of the PV solar generation systems during daytime. For other inverter based DGs, this may be done at any time during the entire 24-hour period, as long as there is any inverter capacity remaining after real power generation. Of course, not all DGs connected to power transmission and distribution network need to participate in this scheme. Some DGs may opt out or may be unable to participate. Those who can participate receive the necessary parameters and constraints from the energy control center and attempt to control their PCC voltage to the desired value. For each DG functioning as STATCOM, even if they are unable to achieve the desired PCC voltage, adjusting the PCC voltage closer towards the desired value can assist the utility company.

In principle, for each DG, when the voltage at the point of common coupling ($V_{PCC}$) is different from its optimal voltage level ($V_{PCC\_ref}$) a STATCOM tries to regulate the voltage at PCC to its optimal value ($V_{PCC\_ref}$) by exchanging (injecting or absorbing) controlled reactive power with the network. When the PV solar farm acting as STATCOM injects reactive power (capacitive mode operation), there is an increase in the PCC voltage. However, if the PV solar farm acting as STATCOM absorbs reactive power (inductive mode operation), there is a decrease in the PCC voltage. A controlled reactive power exchange (injection/absorption) in response to the measured value of the PCC voltage will therefore regulate the PCC voltage and can be used to maintain or approximate the desired optimal value.

While the above discussion describes a system-wide coordination of various DGs to minimize line losses, a single DG can also implement another aspect of the invention which can also reduce line losses. The above discussion notes that an optimal power flow study can be done at the energy control center and the desired voltage level setpoints can be communicated to the various DGs on the power transmission and distribution network. Similarly, the OPF study can be done local to each DG. As shown in FIG. 3, the OPF block 120 can receive data (e.g. operating parameters and system operating constraints) specific to the power transmission and distribution network to which the power generation facility is coupled. The power generation facility can then perform its own calculations for an optimal power flow study to determine the optimal voltage for its own PCC. This optimal value can then be approximated or met when the power generation facility provides voltage control while acting as STATCOM.

Figure 5:
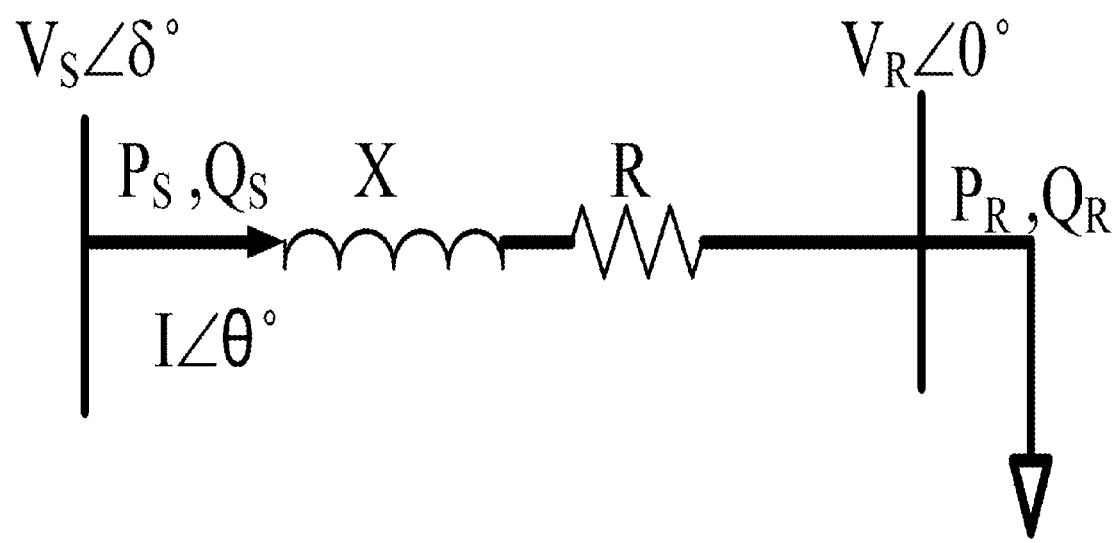
FIG. 5 schematically illustrates a two bus network for which line loss calculations are made.

As an example for minimum line loss calculations, for a two bus network as shown in FIG. 5, the power phasor and power loss equation can be expressed as $$\overline{S}_R = P_R + jQ_R = \overline{V_R} \cdot \overline{I}^*,$$

or $$\overline{S}^*_R = P_R - jQ_R = \overline{V}^*_R \cdot \overline{I} \quad (1)$$

$$P_{Loss} = I^2 \cdot R = R \cdot (P_R^2 + Q_R^2)/V_R^2 \quad (2)$$

And this can be simplified as $$I^2 = (P_R^2 + Q_R^2)/V_R^2, \text{ and,}$$

$$\overline{V}^*_R = \overline{V}_R = V_R \angle 0.$$

By neglecting the capacitive line charging effect of an overhead line, the receiving end voltage can be expressed in complex form as $$V_R \angle 0° = V_S \angle \delta° - \overline{I}(R + jX) \quad (3)$$

After manipulation with equation (1), the final form of equation (3) becomes $$V_R^2 = \frac{V_S^2 - 2 \cdot K_1 \pm \sqrt{\{(V_S^2 - 2 \cdot K_1)^2 - 4 \cdot (K_1^2 + K_2^2)\}}}{2}$$

and $$\delta = \tan^{-1}\left(\frac{K_2}{V_R^2 + K_1}\right) \quad (4)$$

where $$K_1 = (P_R \cdot R + Q_R \cdot X), \text{ and,}$$

$$K_2 = (P_R \cdot X - Q_R \cdot R)$$

Note that the above expressions are also valid with the DG connected at the load bus. For this case, '$P_R$' and '$Q_R$' are the resultants of load and generation amounts which could be even negative. However, by using the positive term before the radical in the receiving end voltage expression for the stable operation, the loss can be found from equation (2). It is noted that, once the angle '$\delta$' is calculated with equation (4), and if the sending end voltage is considered as a slack bus, then '$V_S \angle \delta$' can be replaced with '$V_S \angle 0$' and '$V_R \angle 0$' can be replaced with '$V_R \angle -\delta$'. Thus, for the system shown in FIG. 5, if one starts from the slack bus, by knowing the power injected into the bus and by successively replacing the receiving end voltage angle with the calculated angle, the aggregated loss over the network can be obtained with a negligible amount of error due to the capacitive effect of the line. It should be clearly evident from equations (2) and (4) that, for $P_{loss} = f(P_R, Q_R, V_S, R, X)$ (where all the quantities are constant for a given network with known power generation and loads), the required net '$Q_R$' can be found by differentiating '$P_{loss}$' with respect to '$Q_R$' and then equating this to zero. Once the required net '$Q_R$' is determined, then, by inserting this value into equation (4), we arrive at the optimal set point of voltages for minimum system loss. The analysis presented above is provided to illustrate the concept of line loss minimization in a two bus system. However in general, for more complex and realistic power system networks, an Optimal Power Flow (OPF) solution, utilizing the standard Optimal Power Flow software packages commercially available, is needed to determine the desired voltage set points at different locations to minimize the line losses.

Another aspect of the invention provides a method for lowering line losses on a power transmission and distribution network using inverter based power generation facilities coupled to the network. The steps in this method are illustrated in FIG. 6.

Figure 6:
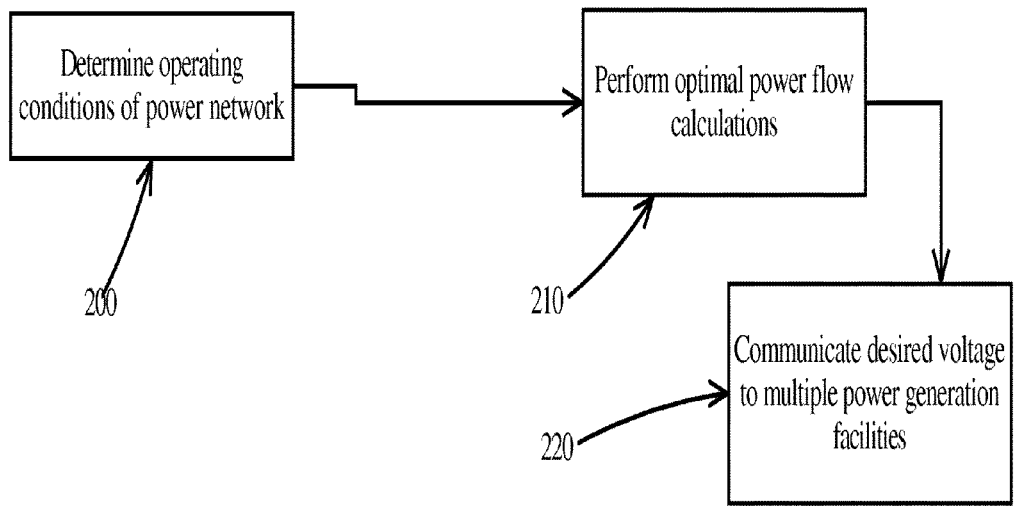
FIG. 6 is a flowchart detailing the steps in a method according to one aspect of the invention.

Referring to FIG. 6, the first step in the process is that of finding or determining the operating conditions and system operating constraints of the power transmission and distribution network (step 200). These operating conditions may include such parameters as, (i) network impedances, (ii) slack bus voltage and angle, (iii) real and reactive power of all loads in the system, (iv) real power and voltage of all the generators (including Distributed Generators), (v) Operating constraints, etc.

Once the operating conditions have been determined, an optimal power flow determination can be performed based on the operating conditions and constraints (step 210). This step would involve using the operating conditions and constraints to find the optimal voltages at different locations for the power transmission and distribution network that would minimize the line losses on the network. As noted above, line losses stem from voltage differences between different points on the network. Regulating the voltage at different points in the network can work to reduce such differences and thereby reduce line losses.

After the optimal power flow determination, the desired optimal voltage setpoints arrived at can then be communicated with the various inverter-based power generation facilities coupled to the power transmission and distribution network (step 220). Once received at the various power generation facilities, each power generation facility that participates in the voltage control support can then provide suitable voltage control at its PCC. This process can be repeated after a set time interval to ensure that the line losses are continuously minimized or reduced.

Figure 7:
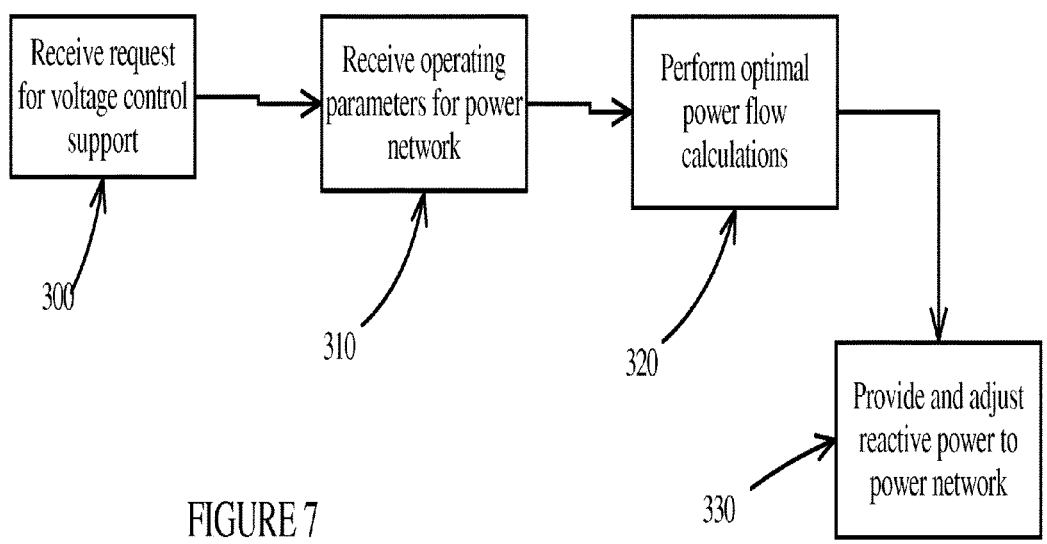
FIG. 7 is a flowchart detailing the steps in another method according to yet another aspect of the invention.

In another embodiment, instead of receiving the actual optimum desired voltage setpoints, each inverter based power generation facility can determine the desired voltage for its location on the power transmission and distribution network. For this embodiment of the invention, the steps are as detailed in FIG. 7. This method starts with receiving a request for voltage control support for line loss minimization (step 300). This request is usually received from an energy control center. Along with the request the power generation facility should also receive operating parameters and operating constraints from the energy control center (step 310). Based on these operating parameters and constraints, the power generation facility can perform its own optimal power flow calculations to find the desired voltage for its location (step 320). Once this has been found, the power generation facility can then provide appropriate voltage control to the power distribution and transmission network to adjust its PCC voltage towards the desired voltage (step 330).

As noted above, the present invention opens up new avenues for revenue generation for the operators and owners of inverter based power generation facilities. Operators of such inverter-based power generation facilities can charge the operators of the power transmission and distribution network for the voltage control support provided. The line losses reduced or minimized by the voltage control support directly translates into savings for the power network operators and these savings can be monetized by the power generation facility operators. These generation facility operators can charge the utility companies or the power network operators on a time basis (how long voltage control support was provided), a control support amount provided basis (how much reactive power was needed to approach or achieve the desired voltage), time of day basis (for solar farms, a premium can be charged for day-time voltage control support), or any combination of the above provided bases.

All the proposed embodiments and capabilities of the invention can be achieved for any type of power distribution or power transmission network, be it of radial type or meshed type.

It should be noted that the term "transmission and distribution line losses" encompasses both the real line losses (resulting in heat) and reactive line losses (resulting in poor voltage profile).

Referring back to FIG. 3, it should be clear that the auxiliary PCC voltage controller illustrated is not part of the conventional inverter controller. In fact, the auxiliary PCC voltage controller in the figure only has one input to the conventional inverter controller. Because of this, conventional inverter controllers can be easily augmented with (in new DG installations) or even retrofitted (in existing DG installations) with the auxiliary PCC voltage controller, thereby providing the owners and operators of inverter based power generation facilities with the advantages of the present invention as described above.

It should also be clear that the inverter based power generation facilities which act as STATCOM to provide voltage control for the objective of line loss minimization, only do so by exchanging (injecting or absorbing) controlled reactive power with power transmission and distribution network utilizing the unused inverter capacity i.e., inverter capacity which is available after real power generation. The power generation facility does not curtail its normal real power generation function, either partly or fully to provide network line loss mitigation support but merely provides voltage control to the network utilizing the inverter capacity remaining after real power generation. The normal real power production function of the DG continues unabated while this line loss minimization function is provided.

It should also be clear that the remaining inverter capacity after real power generation may not be enough to provide voltage control to the desired voltage level at that DG location. In this case, the DG acting as STATCOM utilizes the available remaining inverter capacity to regulate the voltage to a value as close as possible to the desired value. Even this can reduce line losses substantially.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for reducing line losses in a power transmission and distribution network, the method comprising:
   a) at a specific inverter based power generation facility, receiving an indication that voltage control support is required for line loss minimization;
   b) receiving operating parameters and constraints of said power transmission and distribution network from an energy control center of said power transmission and distribution network;
   c) determining a specific voltage for a specific location on said power transmission and distribution network, said specific location corresponding to said specific inverter based power generation facility, said specific voltage being determined based on an optimal load flow determination performed at said specific inverter based power generation facility and said optimal load flow determination being based on said operating parameters and constraints received in step b), said specific voltage being a voltage that minimizes line losses on said power transmission and distribution network;

d) regulating a voltage at a point of common coupling for said specific inverter based power generation facility, said voltage being regulated towards said specific voltage through injecting or absorbing controlled reactive power with said power transmission and distribution network, said controlled reactive power being based on an inverter capacity for said specific inverter based power generation facility available after real power generation, wherein a normal real power production function of said specific inverter based power generation facility continues while injecting or absorbing controlled reactive power with said power transmission and distribution network;

e) repeating steps b), c) and d) at a set time interval determined by said energy control center of said power transmission and distribution network;

wherein an inverter of said specific inverter based power generation facility operates as a static synchronous compensator (STATCOM) to inject or absorb controlled reactive power with said power transmission and distribution network in step d);

wherein said specific inverter based power generation facility and the said energy control center coordinate said voltage regulation on said power transmission and distribution network.

2. A method according to claim 1, wherein said power generation facility is a solar farm.

3. A method according to claim 1, wherein said power generation facility is a wind farm.

4. The method according to claim 1, wherein step d) comprises:

d1) determining said voltage at said point of common coupling;

d2) determining a difference between said specific voltage and said voltage at said point of common coupling;

d3) regulating said voltage at said point of common coupling for said power generation facility to reduce said difference determined in step d2) through said injecting or absorbing of controlled reactive power with said power transmission and distribution network.

5. A method according to claim 1, further including the step of coordinating voltage control support across said power transmission and distribution network between different inverter based power generation facilities;

wherein said inverter based power generation facilities operate as STATCOMs in coordination with other voltage control devices in said power transmission and distribution network to minimize line losses across said power transmission and distribution network.

6. A method according to claim 5, wherein at least one of said inverter based power generation facilities executes the method steps a) through e) of claim 1 when coordinating with said different inverter based power generation facilities.

7. A method according to claim 5, wherein each of said different inverter based power generation facilities provide specific levels of voltage control at each specific location of said different inverter based power generation facilities to minimize line losses in said power transmission and distribution network.

8. Non-transitory computer readable media having encoded thereon computer readable and computer executable instructions which, when executed, implements a method for reducing line losses in a power transmission and distribution network, the method comprising:

a) at a specific inverter based power generation facility, receiving an indication that voltage control support is required for line loss minimization;

b) receiving operating parameters and constraints of said power transmission and distribution network from an energy control center of said power transmission and distribution network;

c) determining a specific voltage for a specific location on said power transmission and distribution network, said specific location corresponding to said specific inverter based power generation facility, said specific voltage being determined based on an optimal load flow determination performed at said specific inverter based power generation facility and said optimal load flow determination being based on said operating parameters and constraints received in step b), said specific voltage being a voltage that minimizes line losses on said power transmission and distribution network;

d) regulating a voltage at a point of common coupling for said specific inverter based power generation facility, said voltage being regulated towards said specific voltage through injecting or absorbing controlled reactive power with said power transmission and distribution network, said controlled reactive power being based on an inverter capacity for said specific inverter based power generation facility available after real power generation, wherein a normal real power production function of said specific inverter based power generation facility continues while injecting or absorbing controlled reactive power with said power transmission and distribution network;

e) repeating steps b), c) and d) at a set time interval determined by said energy control center of said power transmission and distribution network;

wherein an inverter of said specific inverter based power generation facility operates as a static synchronous compensator (STATCOM) to inject or absorb controlled reactive power with said power transmission and distribution network in step d);

wherein said specific inverter based power generation facility and the said energy control center coordinate said voltage regulation on said power transmission and distribution network.

9. A method of generating income for at least one inverter based power generation facility operatively coupled to a power transmission network, the method comprising:

a) determining specific voltage setpoints for said at least one inverter based power generation facility based on an optimal load flow determination performed at an energy control center, said specific voltage setpoints being voltages that minimize line losses on said power transmission and distribution network;

b) communicating said specific voltage setpoints from said energy control center to said at least one inverter based power generation facility;

c) repeating steps a) and b) at set time intervals determined by said energy control center;

d) operating said at least one inverter based power generation facility as a static synchronous compensator (STATCOM) and using said at least one inverter based power generation facility to inject or absorb controlled reactive power with said power transmission and distribution network to thereby regulate a voltage at a point of common coupling, said voltage being regulated towards a specific voltage setpoint for said at least one inverter based power generation facility, said point of common coupling being a coupling point between said at least one inverter based power generation facility and said power transmission and distribution network;

e) charging a power utility entity for providing voltage control support for line loss minimization to said power transmission and distribution network;

wherein said controlled reactive power injected to or absorbed from said power transmission and distribution network is based on an inverter capacity for said at least one inverter based power generation facility available after real power generation.

10. A method according to claim 9, wherein said energy control center coordinates said voltage regulation across said power transmission and distribution network.

* * * * *